UNITED STATES PATENT OFFICE.

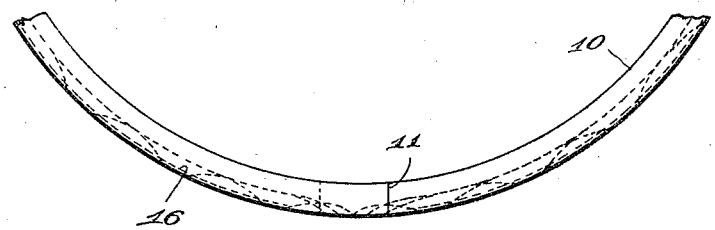
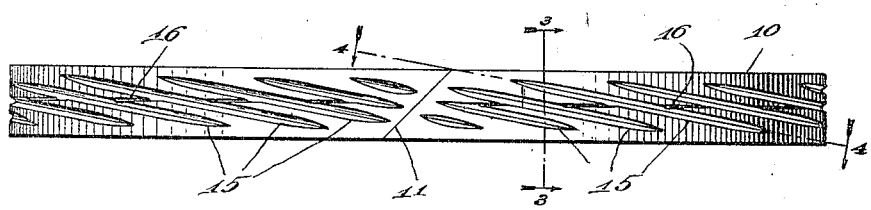
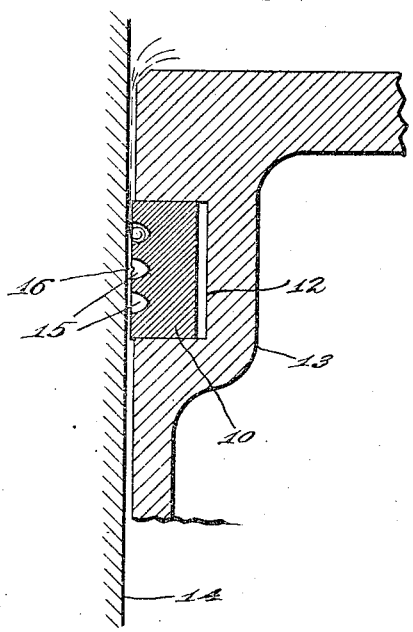
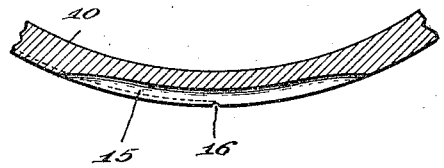

HARRY ARCHIBALD WAINWRIGHT, OF CONNERSVILLE, INDIANA, ASSIGNOR TO WAINWRIGHT ENGINEERING CORPORATION, OF CONNERSVILLE, INDIANA, A CORPORATION OF INDIANA.

PISTON-RING.

1,401,930.  Specification of Letters Patent.  Patented Dec. 27, 1921.

Application filed August 13, 1919. Serial No. 317,216.

*To all whom it may concern:*

Be it known that I, HARRY A. WAINWRIGHT, a citizen of the United States, residing at Connersville, in the county of Fayette and State of Indiana, have invented a new and useful Piston-Ring, of which the following is a specification.

It is the object of my invention to produce a piston ring which reduces leakage to a minimum.

The accompanying drawing illustrates my invention: In such drawing, Figure 1 is a fragmentary plan of a piston ring embodying my invention; Fig. 2 is an edge view of such piston ring on a somewhat larger scale; Fig. 3 is a fragmentary sectional view of a cylinder and piston equipped with my improved piston ring, the piston ring being in section on the line 3—3 of Fig. 2, and clearances being greatly exaggerated; and Fig. 4 is a section on the line 4—4 of Fig. 2.

The piston ring 10 is split in the usual manner, as shown having the usual diagonal split 11; and it is mounted in the usual piston-ring groove 12 in a piston 13 so that its outer face bears against the inner surface of a cylinder 14. All this is as usual.

The outer peripheral surface of the piston ring, abutting against the inside wall of the cylinder, is provided with a series of circumferentially short, overlapping, oblique grooves 15, which are superficial grooves only and do not extend through the ring. These grooves 15 overlap each other so that preferably there are always at least two such grooves, and in many places three such grooves, on any line drawn across the peripheral face of the piston ring parallel to the axis.

In operation, assuming the piston and cylinder to be those of an internal combustion engine, when the explosion occurs the explosion pressure tends to force the gases past the piston between it and the cylinder wall. This is largely prevented by the tight fit of the piston ring against the cylinder wall, in the usual manner. However, as this fit is never perfect, some of the gases force their way between the peripheral face of the piston ring and the adjacent part of the cylinder wall and tend to crowd past the open grooves 15 in the outer face of the piston ring. When these gases reach such a groove, they circulate therein in small eddy currents, which whirl at high velocity and produce a substantially perfect seal between the piston ring and the cylinder wall. This is probably due to the centrifugal action of the rapidly whirling eddy currents. Should there be any slight leakage past the first groove 15, such leakage is stopped at the latter grooves which the gases encounter in their attempted escape past the piston ring, as there are always two and sometimes three such grooves in any path of escape. Thus this makes a very effective preventive of leakage.

To obtain the best action, the grooves 15 should be relatively short circumferentially, as if they are too long the leakage increases, probably due to the fact that instead of setting up eddy currents at any point to prevent leakage the gases which enter the grooves 15 tend to travel circumferentially around the piston ring by way of such grooves. Therefore, I make the grooves 15 comparatively short, circumferentially, as shown, in order to obtain the best results.

In addition to the oblique overlapping grooves 15, I preferably provide interconnecting notches 16 which connect adjacent grooves 15, preferably at their middle points. These notches 16 may together constitute a continuous circumferential groove around the ring save at the split 11. The interconnecting notches 16 are preferably of very much smaller cross-section than are the slots 15. By this construction, these notches 16 do not interfere with the whirling eddy currents in the grooves 15, and so do not interfere with the sealing action of such eddy currents. Indeed, they assist in such sealing action, for although not big enough in cross-section to interfere with the production of the whirling eddy currents they allow the dissipation around the ring of any excess pressure which for any reason may tend to develop at any point between the face of the piston ring and the cylinder wall and which save for such dissipation might tend to force the piston ring away from the cylinder wall at that point.

I claim as my invention:

1. A piston ring having on its peripheral face a circumferential series of oblique overlapping grooves, said grooves being so arranged that at any point around the piston there are always two grooves along a line parallel to the axis.

2. A piston ring having on its peripheral face a circumferential series of circumferentially short oblique overlapping grooves.

3. A piston ring having on its peripheral face a circumferential series of oblique overlapping grooves.

4. A piston ring having on its peripheral face a circumferential series of oblique overlapping grooves, the peripheral face of said piston ring also having notches which interconnect adjacent oblique grooves substantially at their middle points.

5. A piston ring having on its peripheral face a circumferential series of oblique overlapping grooves, the peripheral face of said piston ring also having notches which interconnect adjacent oblique grooves.

6. A piston ring having on its peripheral face a circumferential series of oblique overlapping grooves, the peripheral face of said piston ring also having notches which interconnect adjacent oblique grooves, said interconnecting notches having cross-sections which are relatively small as compared to those of the oblique grooves.

7. A piston ring having on its peripheral face a number of circumferentially short overlapping grooves, said peripheral face also having notches interconnecting said overlapping grooves, said interconnecting notches having cross-sections which are relatively small as compared with the cross-sections of said grooves.

In witness whereof, I have hereunto set my hand at Connersville, Indiana, this fifth day of August, A. D. one thousand nine hundred and nineteen.

HARRY ARCHIBALD WAINWRIGHT.